United States Patent
Fathi et al.

(10) Patent No.: US 9,159,362 B2
(45) Date of Patent: Oct. 13, 2015

(54) METHOD AND SYSTEM FOR DETECTING AND RECOGNIZING SOCIAL INTERACTIONS IN A VIDEO

(71) Applicant: Disney Enterprises, Inc., Burbank, CA (US)

(72) Inventors: Alizreza Fathi, Burbank, CA (US); Jessica Hodgins, Burbank, CA (US); James Rehg, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 132 days.

(21) Appl. No.: 13/917,267

(22) Filed: Jun. 13, 2013

(65) Prior Publication Data

US 2014/0270707 A1    Sep. 18, 2014

Related U.S. Application Data

(60) Provisional application No. 61/788,601, filed on Mar. 15, 2013.

(51) Int. Cl.
| | | |
|---|---|---|
| G11B 27/00 | (2006.01) | |
| H04N 5/93 | (2006.01) | |
| G11B 27/031 | (2006.01) | |
| G06K 9/00 | (2006.01) | |
| G11B 27/28 | (2006.01) | |

(52) U.S. Cl.
CPC .......... *G11B 27/031* (2013.01); *G06K 9/00228* (2013.01); *G06K 9/00335* (2013.01); *G06K 9/00624* (2013.01); *G11B 27/28* (2013.01)

(58) Field of Classification Search
CPC ...................... G06K 9/00771; G06K 9/00335
USPC .......................................... 348/169; 386/278
See application file for complete search history.

(56) References Cited

U.S. PATENT DOCUMENTS

| | | | |
|---|---|---|---|
| 7,460,150 B1 * | 12/2008 | Coughlan et al. | 348/169 |
| 2006/0187305 A1 * | 8/2006 | Trivedi et al. | 348/169 |
| 2013/0155228 A1 * | 6/2013 | Farn et al. | 348/143 |

* cited by examiner

*Primary Examiner* — Hung Dang
*Assistant Examiner* — Girumsew Wendmagegn
(74) *Attorney, Agent, or Firm* — Sheppard, Mullin, Richter & Hampton, LLP

(57) ABSTRACT

A system and method for providing a plurality of frames from a video, the video having been taken from a first person's perspective, identifying patterns of attention depicted by living beings appearing in the plurality of frames, identifying social interactions associated with the plurality of frames using the identified patterns of attention over a period of time and using the identified social interactions to affect the subsequent use, storage, presentation, or processing of the plurality of frames.

24 Claims, 3 Drawing Sheets

METHOD AND SYSTEM FOR DETECTING AND RECOGNIZING SOCIAL INTERACTIONS IN A VIDEO

PRIORITY CLAIM/INCORPORATION BY REFERENCE

The present application claims priority to U.S. Ser. No. 61/788,601, filed on Mar. 15, 2013, which is incorporated by reference herein.

BACKGROUND

Groups of people engaged in activities, such as visiting an amusement park, attending a convention, shopping, attending a sporting event, and participating in outdoor activities may record their activities using video cameras. In some cases, these may include wearable cameras. The result of this recording includes segments that are interesting or memorable, and segments that are less memorable. Manually reducing these recordings to their most interesting or memorable portions, in order to yield a final product that is an appealing record of the activity to the members of the group, is a time-consuming task. Therefore, a mechanism for performing this process automatically or semi-automatically is desirable.

DETAILED DESCRIPTION

Figure 1:
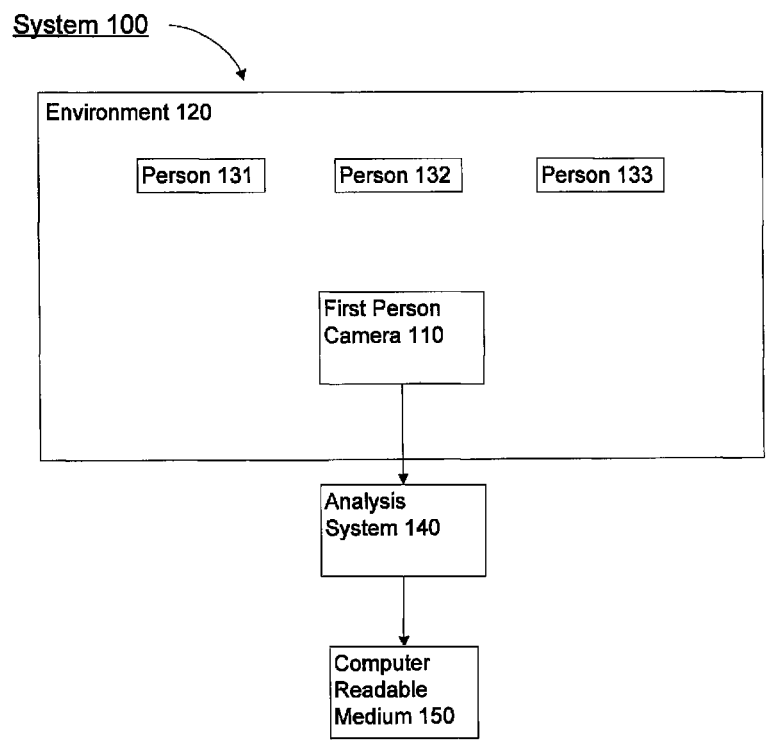
FIG. 1 shows a schematic view of a system for capturing social interactions from a first-person perspective according to an exemplary embodiment.

The exemplary embodiments may be further understood with reference to the following description of exemplary embodiments and the related appended drawings, wherein like elements are provided with the same reference numerals. Specifically, the exemplary embodiments relate to methods and systems for detecting and recognizing social interactions in a video.

Recording activities and events on video is an increasingly popular activity at sporting events, outdoor and indoor activities, theme park visits, concerts and the like. The advent of digital image and video recording reduces the cost of capturing imagery such that it is common to record a great deal of imagery during the event. This allows people to pay less attention to camera operation and making composition and editing decisions during an event so they can actually participate in the event. However, the task of editing the capture material to reproduce the salient portions becomes more significant. Thus, it is desirable to be able to provide a video recording capturing interesting or memorable portions of the activity being captured.

Various features in the captured video provide clues as to which portions are interesting. For example, interesting portions include social interactions among members of a group, as the portion of an experience that is shared with other members of a group is often memorable. Social interactions include, for example, dialogue, discussions, singing, and monologue that may be characterized by various detectable audio and visual cues in the content recorded in a first-person, egocentric video. In some embodiments, the first-person video may be captured by a wearable camera. Social interactions may occur between two or more people of any age, including infants, and more generally may occur between one or more people and animals or machines (e.g., human-like robots or other interactive machines). First-person cameras may be preferable to cameras mounted within an environment in which interesting or memorable events are taking place because a first-person video better shows how the individual user experienced the interesting or memorable events, and because generally mounted cameras cannot keep track of personal experiences of multiple individuals simultaneously.

FIG. 1 illustrates a schematic view of an exemplary system 100 for capturing social interactions recorded using a first-person camera. The system 100 includes a first-person camera 110 (also referred to simply as "camera 110" for brevity) recording video from the first-person perspective of a user. Camera 110 need not conform to any particular specifications, but may be any camera capable of recording video from the perspective of the user; in one embodiment, for which social interactions are identified in the manner described herein, the camera 110 may include a linear scale fish-eye lens. In some exemplary embodiments, the camera 110 may be a wearable camera, such as a camera mounted to a hat worn by the user; in other exemplary embodiments, the camera 110 may be a handheld camera. In one embodiment, the camera 110 records audio in synchronization with the video. In another embodiment, the camera 110 records solely video.

The user may record video using the camera 110 in an environment 120, which may be, in one embodiment, a theme park, but in other embodiments may be any other environment, such as a sporting arena, theatre, race track, park, school, and the like, where social interactions can be used to deduce what portions of a recording users might find valuable. Also present within the environment 120 are other persons 131, 132 and 133. The illustration of three people besides the user of the camera 110 is exemplary; environment 120 may include any number of people. The persons 131, 132, and 133 may be part of the same social group as the user of the camera 110 (e.g., a group of friends, a group of coworkers, a group of relatives, etc.), or may be strangers. In one embodiment, the user of the camera 110 may be visiting environment 120 (e.g., a theme park) with a social group (e.g., a group of friends), and the video recorded by camera 110 may include a mix of members of the social group and strangers.

Figure 2:
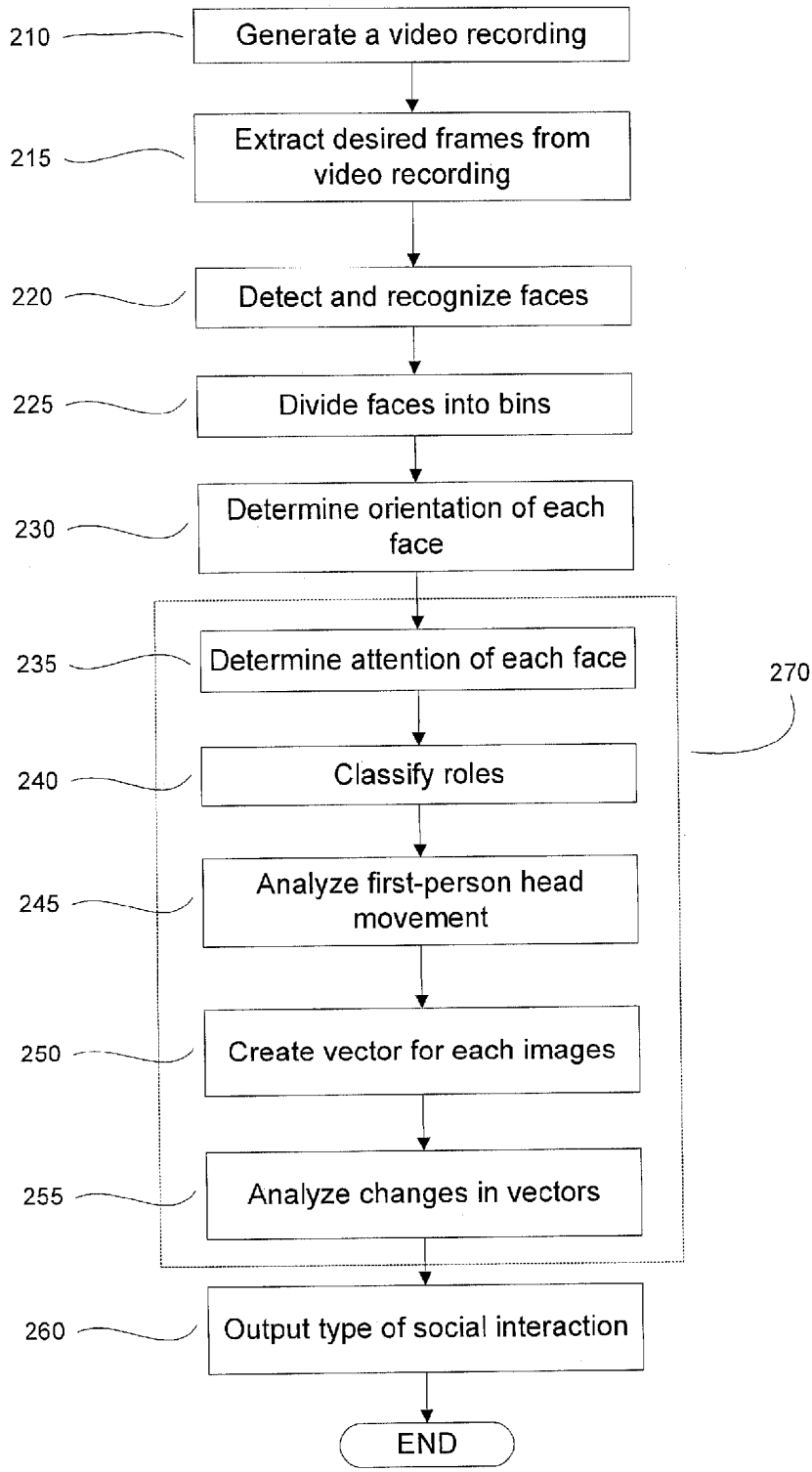
FIG. 2 shows an exemplary method for capturing social interactions from a first-person perspective according to an exemplary embodiment.

After the user has left the environment 120, the video and audio recorded by the camera 110 are loaded to an analysis system 140 for processing in accordance with the exemplary method 200, described in reference to FIG. 2. Camera 110 may be provided to the user by an operator of the environment 120, or it may be provided by the user of the camera 110, or by a third-party service provider. The analysis system 140 may output the results of the video processing, in accordance with the exemplary method 200, to computer-readable medium 150, which may be a DVD, a hard drive, a portable rewritable medium such as a USB thumb drive, or any other type of computer-readable medium capable of storing the processed video recording. In another embodiment, the method 200 may be performed in real time, and the results may be output directly to a user.

FIG. 2 illustrates an exemplary method 200 for identifying memorable or interesting portions of a video recorded by a first-person camera. The method 200 is described herein with reference to the exemplary system 100, but the method 200 is not limited to the system 100, and may be performed by any other system capable of performing the functions described herein, e.g., by a combination of hardware and software integrated with camera 110, a dedicated purpose video processor, a video processing service, or any available combination of hardware and software that can be accessed and has sufficient computational resources to implement the processes described herein.

In 210, a recording is generated or otherwise obtained from a recording storage location. It is contemplated that the techniques described herein can also be applied to a streaming video that is not previously recorded so long as sufficient processing power exists to perform the described operations in real time. In such an implementation, salient and interesting portions of a streaming video can be identified in real time such that only those identified portions are persistently recorded. As used herein, the term "recording" is intended to encompass streaming video. As described above, the recording may be captured using a first-person camera 110 worn or carried by a user, in order to record point of view video of what the user is seeing during the time of the recording. The recording may be captured during any desired time interval that includes social interactions which occur during the time interval being captured.

Many of the actions described in method 200 are performed on a frame-by-frame basis, meaning that the steps described herein are performed on individual frames. The steps may be performed on all frames in a video, or may be performed on some subset of frames (e.g., every tenth frame) that are chosen to provide a desired compromise between performance and computational expense. To this end, in 215, the desired frames are extracted from the recording.

In 220, an individual frame is analyzed to detect individual faces within the image, which may be accomplished using, for example, color-based, feature-based techniques, motion-based, neural network, model-based or other available face detection techniques that can locate faces in an unconstrained scene using the available computational resources. Although it is desirable to detect all of the faces in a scene, it is not imperative in that implementations described herein can use the information from as many faces as are detected to make useful decisions. Hence, detection techniques with lower computational demands may be preferable in many instances. 220 results in, for each of the frames considered, a location and identity of faces present in the frame. As used here, "identity" does not signify any particular individual's name, but, rather, signifies that each individual may simply be designated with an identifier (e.g., a sequential series of numbers). Thus, in one simple example, data for a first image may indicate that it contains person 1 and person 2, and their corresponding locations, and data for a second image may indicate that it contains person 2 and person 3, and their corresponding locations.

In 225, the scene shown in the frame being analyzed is divided into a plurality of angular bins and a plurality of distance bins, and the number of faces shown within each bin is counted. In this manner, a spatial reference framework is created for the frame, whereby objects in the image can be characterized as to where they are in three dimensional space. The number, size, and shape of the bins may vary among differing implementations, and different coordinate systems can be used so long as the coordinate system provides for labeling portions of the two dimensional image in three dimensional space. Generally, a larger number of bins in either the angular or distance dimensions will provide greater granularity in the classification, which may affect results depending on the number of people in the scene and/or distribution of people in the scene, or other factors such as the mapping function of the optical system used to capture the image. Neither the angular nor distance bins need to be uniformly sized and distributed, and the particular size and distribution can be selected to meet the needs of a particular application.

In one embodiment, the area in front of the first-person imagetaker is divided into multiple substantially equally sized angular bins. In a particular example using a camera 110 with a fish-eye lens having a 150-degree field of view, five angular bins are defined, each spanning a 30 degree arc in the image for a total span of about 75 degrees to the left of the imagetaker to 75 degrees to the right of the imagetaker. In addition, a plurality of distance bins may be defined. In a particular example, four distance bins are defined, with each distance bin representing about 1.25 meters in depth consecutively spaced from the imagetaker. The image is analyzed in terms of [angle:distance]-pair bins. In the particular example, these five angular bins and four distance bins yield a total of twenty [angle:distance]-pair bins.

The distance of each face identified in 220 may be estimated, for example, based on the geometry of the camera optics and the size of the face as shown in the image; a larger face may be determined or estimated to be closer to the camera. The angle at which the face appears with respect to the imagetaker may then be determined or estimated based on the distance and the position of the face within the image. Once a face has had its distance and angle determined, and has been classified into corresponding bins in 225, the number of faces within each bin is counted. The information provided in 225 is essentially an n-dimensional histogram for each frame, where "n" is the number of [angle:distance]-pair bins, and the value of a dimension is a count of the number of faces within the corresponding bin.

In 230, the orientation of a face within each frame is estimated; this may be accomplished using known image processing techniques, and may be performed in conjunction with the face detection discussed above with reference to 220.

In 270, a face is characterized using various clues that can be derived from the image, including patterns of attention of persons depicted in the image and first-person head movement. These clues can be interpreted for a single frame as well as interpreted over time using information from multiple frames in a sequence. In this manner, a social interaction can be detected and used to identify interesting portions of a video. In the exemplary embodiment described herein, 270 encompasses 235-255, but these sub-processes may be performed in any order, and in other embodiments some of these sub-processes may not be present.

Patterns of attention refers to recurring mannerisms in which people express interest in each other or with objects by paying attention to them. These recurring mannerisms can be identified as patterns in the imagery captured of a social interaction. One way of identifying these patterns is to determine roles adopted by individuals in the scene, such as a "speaker", "listener", "teacher", "student", "group member" or "stranger". By analyzing the changes of the roles over time, one can describe the patterns of turn taking and attention shift that are important indicators of social interactions. Social interactions are characterized by patterns of attention between individuals over time. When one person speaks, others pay attention to that person; when another person begins speaking, the attention shifts to the new speaker. The shifting of roles is another important characteristic of a social interaction: slowly changing speaker/listener roles might indicate that the interaction is a lecture or monologue, whereas rapidly changing speaker/listener roles might indicate a dialogue or discussion.

The focus of an individual's attention can be inferred from where that individual is looking or directing their attention in

235. An individual may be attending to the first-person image taker, or the person may be attending to another person, or object in the scene. Thus, by determining where each person is looking during a frame, and determining how that person's attention changes over time, the people in a scene can be classified into apparent roles in 240, and the change in roles over time can be used to characterize the social interactions depicted in the scene.

The location where each person is looking is inferred through the use of a Markov Random Field model ("MRF"). The MRF includes, as input, observations $P_{f_i}$ containing the location and orientation of face $f_i$ in the image as determined in 220, 225 and 230, and hidden variables $L_{f_i}$ representing the 3D location at which each face $f_i$ is looking. Each image is discretized into a grid, which may, in an exemplary embodiment, have a resolution of 5 cm×5 cm; the label space for each $L_{f_i}$ (i.e., the set of possible labels that can be assigned to each $L_{f_i}$) is the set of grid locations. It should be noted that the method of defining a label space described herein is only one possible method for doing so, and that other methods are possible. In other embodiments, label spaces could have non-uniform resolution, be discontinuous, overlap, or be non-linear. In one embodiment, the label space for a frame could be defined so as to only include detected faces in the image, and each face would be labeled with an indication of another face to which it is attending. The MRF may include a set of unary potentials defined based on information that can be gleaned from a given face itself modeling the likelihood of the given face looking at each grid cell based on the observations, a well as a set of binary potentials for modeling the context between the various faces in the image.

The unary potentials may include three terms:

$$\phi_U(L_{f_i}, P_{f_1}, P_{f_2}, \ldots, P_{f_N}) = \phi_1(L_{f_i}, P_{f_i}) \times$$

$$\phi_2(L_{f_i}, P_{f_1}, \ldots, P_{f_N}) \times$$

$$\phi_3(L_{f_i}, P_{f_i})$$

As noted above, $f_i$ represents each face in the image and $L_{f_i}$ represents the location at which $f_i$ is looking. N represents the number of faces in the image, and $P_{f_i}$ represents the location and orientation of face $f_i$, which may be modeled as $$P_{f_i} = \begin{bmatrix} V_{f_i} \\ T_{f_i} \end{bmatrix}$$

containing orientation unit vector $V_{f_i}$ and location vector $T_{f_i}$. The first potential may be modeled as a Gaussian function that computes the possibility of face $f_i$ looking at location l based on the location and orientation of $f_i$ in space:

$$\phi_1(L_{f_i} = l, P_{f_i}) = \frac{1}{\sigma_1 \sqrt{2\pi}} \exp\left\{-\frac{\|V_{f_i} - (\overline{l - T_{f_i}})\|^2}{2\sigma_1^2}\right\}$$

In this expression, $\sigma_1$ represents standard deviation of the Gaussian function as determined empirically from training data. The first unary potential represents the possibility that a face is looking at a given grid location, based on the position and the orientation of the face. The second potential is modeled as a sigmoid function to put a threshold on how close $L_{f_i} = l$ can be to the face $f_i$. This may help to ensure that a face is not determined to be looking at itself.

$$\phi_2(L_{f_i} = l, P_{f_i}) = \frac{1}{1 + \exp\{-(c_2 \cdot \|l - P_{f_i}\|)\}}$$

In this expression, $c_2$ is a constant that is empirically determined from training data. As described above, the second unary potential discourages a solution from determining that a face is looking at itself.

The third unary potential biases faces to be looking at other faces, rather than looking at objects.

$$\phi_3(L_{f_i} = l, P_{f_i}, \ldots, P_{f_N}) = \begin{cases} c_3 & l = P_{f_j} \forall j \neq i \\ 1 & \text{otherwise} \end{cases}$$

In this expression, $c_3$ is a constant operative to increase the chance of face $f_i$ looking at a location l if another face $f_j$ is at that location. The values of the parameters $\sigma_1$, $c_2$ and $c_2$ may be determined by training data, e.g., by manually annotating faces looking at each other in a set of frames and determining the parameters from these examples. It should be noted that in other exemplary embodiments, only one or two of the unary potentials could be used; such an embodiment might be preferable, for example, where it is more likely for individuals to be attending to an object rather than to another face. It should further be noted that that the exemplary embodiment based on the MRF model is only one possibility, and that other mathematical techniques of estimating a probability of what is happening in a scene are possible.

The unary potentials relate to individuals; binary potentials relate to the interactions between people. Binary potential functions bias the detected faces to be looking at the same location in a given image; this is desirable because, if some individuals in an image are looking at something in the image, the likelihood is higher that another person is looking at the same thing. The binary potentials are defined as follows:

$$\phi_B(L_{f_i} = l_1, L_{f_j} = l_2) = \begin{cases} c_B & \text{if}(l_1 = l_2) \\ 1 - c_B & \text{if}(l_1 \neq l_2) \end{cases}$$

In this expression, $c_B$ is a constant between 0.5 and 1, and is determined by cross validation using manually annotated training data. The MRF is then optimized to infer the locations $L_{f_i} = l$ where each face $f_i$ is looking. Because in the examples described herein there are a large number of possible locations (i.e., cells in the grid described above), there can be large numbers of faces in a given frame, and the location at which a face is looking is dependent on that of other faces, an exact solution was intractable. This may not be the case in constrained contexts with less granular analysis, fewer faces, and less interdependence, in which cases an exact solution may be practical. Therefore, in the exemplary embodiment, an approximation is used which is inspired by the α-expansion method, and which iteratively groups or separates faces based on whether they are looking at a common location or not. Under this approximation, each face's attention is assigned to a location by optimizing the face's unary terms. As a result of this optimization, the faces are divided into groups that are looking at a common location. Next, both unary and binary terms are considered, and groups are merged or split iteratively. At each stage of the iterative analysis, the approximation considers a pair of groups and determines whether the total MRF energy increases as a result of merging the groups; if so, the groups are merged. Additionally, at each stage, each group is evaluated to determine whether removing one of the faces increases the total MRF energy, and, if so, the face is removed. This process is then repeated until convergence, e.g., using an iterative analysis.

The result of 235, described above, is, for a given image, an association between detected faces in the image and a label indicating a location in the image where the face is likely to be looking. Though the description of exemplary method 200 describes, in 235, a specific manner of determining the location at which a face is looking, other methods of making the same determination are equally applicable without departing from the broader concepts described herein, including, but not limited to, an MRF including unary and binary potentials using more or fewer terms than those described above, different methods of solving an MRF such as those described above, or a methodology that uses a model other than the MRF described above, such as a neural network-based solution.

The knowledge of where each person in the scene is attending is used to classify individuals into roles. Social interactions may be identified, for example, by the changes in people's roles over time. For example, in a monologue, one individual is a speaker and the remaining individuals are listeners; in a dialogue, two individuals are speakers; etc. Among other factors, analyzing the changes in individuals' roles over time helps to identify and characterize social interactions.

In 240, a role is assigned to individuals in each image. In one exemplary embodiment, the roles may be assigned using the procedure described hereinafter, but other methods for assigning roles may be used without departing from the broader principles of the exemplary embodiments. Each individual is assigned a four-dimensional feature vector. The first term of each feature vector is the number of other faces determined to be looking at the individual, using the information determined in 235. The second term of each feature vector is an indicator of whether the first-person camera is looking at the individual, as determined by the position of the individual within the image (e.g., using a binary value of 1 to denote that the first person is looking at the individual or 0 to denote that the first person is not looking at the individual). The third term of each feature vector is an indicator of whether there is mutual attention between the individual and the first person, as determined by whether the first-person camera is both looking at the individual, and whether the individual is looking at the first-person camera. The fourth term of each feature vector is the number of faces looking at the same location as the individual is looking.

The feature vector for an individual is used to classify the individual into a role. For example, using the feature vector, the individuals are then clustered into a few bins using, for example, k-means clustering based on training data; each bin represents a role. It should be noted that the roles used here are not required to have semantic values (e.g., "speaker", "listener", etc.), but rather are simply identified with designations such as numerical designations to distinguish the roles from one another without attaching any semantic meaning. Semantic values may be used to ease understanding of procedural step for implementation.

A frame may be characterized by the roles that occur in that frame. In one exemplary embodiment, a frame may be characterized not only by the roles present within itself, but also by the roles present in a short time interval around the frame. In one embodiment, the interval may be encompass a few seconds before and after a given frame, but the size of the interval may vary based on context; this may be done in order to enable analysis of the shifts of attention over time.

Another characteristic of a video that may help to categorize the social interaction is first-person head movement, or, more generally, first person attention as inferred from the movement of the first-person camera. For example, in a monologue, the first-person camera may focus on the speaker for an extended period of time; for a dialogue, the first-person camera may move between speakers more frequently. This may be especially useful in cases where two individuals are speaking while walking; in such situations, the faces of the speakers may be absent from the video (hence making it impossible to determine pattern of attention and role information from faces within the scene), in which case the first-person head movement may provide information even without other faces in the scene. In 245 the first-person head movement is analyzed using, for example, optical flow estimation. In such an embodiment, a frame is split horizontally and vertically into a few sub-windows (e.g., a three-by-three grid). The flow vector field in each sub-window is split into horizontal and vertical components, $V_x$ and $V_y$, which are then half-wave rectified into four non-negative channels $V_{x+}$, $V_{x-}$, $V_{y+}$ and $V_{y-}$. A sub-window is then represented with a vector containing the mean value of its motion channels, and the vectors for the sub-windows are concatenated to form a vector representing the entire image. This vector does not represent movement per se, but, rather, represents characteristics of a single image; analysis of the change in this vector over time enables the consideration of first-person head movement. Though the exemplary embodiment uses optical flow estimation to analyze the movement of a first-person camera, those of skill in the art will understand that other methods for achieving a similar result may also be used without departing from the broader principles described herein.

The portion of the method 200 described thus far has included the determination of various parameters related to a frame of the video captured in 210: building a spatial framework or coordinate system for the image comprising a group of bins, each of which includes some number of faces in 225; a classification of the various roles present in the image in 235 and 240; and a representation of first-person head movement in 245. In 250, these various types of information are combined into a feature vector representing a particular frame. The changes in the feature vector from frame to frame may then be analyzed to characterize the social interactions that may be depicted in the video.

In 255, the changes in the feature vectors determined in 250 are analyzed to characterize the social interactions present in the video. The exemplary embodiment described herein uses a Hidden Conditional Random Field ("HCRF") model, but other methods of analyzing the change in the feature vectors (or other representations of the images comprising the recording) may also be implemented without departing from the broader principles described herein, e.g., a Conditional Random Field ("CRF") model, a Hidden Markov Model ("HMM"), a Granger causality model, etc. In the HCRF model of the exemplary embodiment, each frame is assigned a hidden state label based on its features, and then an interaction type is assigned to the sequence based on the state labels and their dependencies. A state can mean a particular pattern within a scene. For example, a state can correspond to four individuals A, B, C and D, where A, B and C are looking at D, and D is looking at A.

Figure 3:
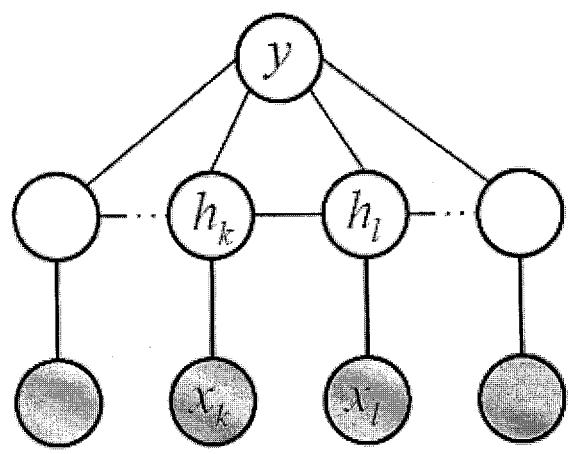
FIG. 3 shows an exemplary model for a social interaction according to the exemplary method of FIG. 2.

FIG. 3 illustrates the HCRF model 300. In FIG. 3, y indicates the social interaction, $h_l$ is the state label of frame l, and $x_l$ is the features of frame l. In an HCRF model, the state labels are latent variables, and are learned by the algorithm through the use of training data. The HCRF model used by the exemplary embodiment can be expressed as:

$$\Psi(y, h, x; w) = \sum_{i=1}^{n} w_{h_i} \cdot \varphi_{x_i} + \sum_{i=1}^{n} w_{y,h_i} + \sum_{(k,l) \in E} w_{y,h_k,h_l}$$

In this expression, the graph E is a chain with nodes corresponding to the hidden state variables, $\phi_{x_i}$ is the feature vector for frame i (or, in other embodiments, for a window of frames around frame i), and w contains the parameters of the model, which may be learned by training using Broyden-Fletcher-Goldfarb-Shanno (BFGS) optimization. The social interaction label y assigned to the entire sequence (e.g., an interval of 200 frames around a given frame) takes binary values in case of detection, and takes multiple values (e.g., dialogue, discussion, monologue, walk dialogue, walk monologue) when trained for recognition of social interaction types. When the interaction is modeled, the label y for which the potential $\Psi$ is maximized is assigned to the sequence.

After the HCRF function is optimized, or the sequences of images are classified as to the social interactions depicted therein in a different manner, the recording captured in 210 has been classified as one or more types of social interactions. Once the interactions have been classified, they are output in 260.

Additional applications for this video classification include a summarization of an individual's daily life based on daily interactions, and video retrieval and indexing. Additionally, the methods described above could be used for enhanced speech recognition, for the purpose of identifying relevant speakers on whom to perform audio beam forming, as well as anomaly detection for security purposes based on a number of individuals looking at a suspicious location. Further, the social interactions captured could be used to measure group emotions, happiness, or satisfaction, or for demographic analysis based on recognizing the age, gender, or ethnicity of individuals within an interacting group.

The embodiments described herein are directed to systems and methods for automatically characterizing what is happening in a video in terms of social interaction. These systems and methods are useful used by themselves, but may also be combined with other technology that performs image analysis to characterize other dimensions such as what is in a video (objects, people, animals and the like) and/or who is in a video (e.g., specifically or generally identifying people by name, gender, age, or other demographic characteristics). Similarly, other techniques are available to characterize what is happening in a video, such as gesture analysis and posture analysis that use body language clues to characterize what is happening or emotional content depicted in a video. Audio information can also be used, for example, by monitoring volume, cadence, length of pauses or length of speech segments, to identify sentiments such as anger, excitement and surprise that may be indicated by a change in volume. Likewise, the content of audio can be analyzed to identify words and phrases that explicitly indicate what is going on in the video. These types of analysis can be used cooperatively with the social interaction characterization taught herein to yield even more information about a video.

The techniques used in the exemplary embodiments may also have use in the analysis of social networks. One might want to analyze and study social networks to better understand the human interactions taking place during an event that is captured by video. This might be useful for behavioral or sociological studies, but might also be useful for various facilities planning, security, operational, or other tasks that can make use of a deeper understanding of how human beings interact with each other. Faces in a video may be clustered into multiple bins, and each bin may be manually assigned to one of the individuals by looking at the faces it contains. The connection of a subject to another individual may then be weighed based on the number of faces in the cluster corresponding to the individual, e.g., the frequency with which the individual appears in first-person video taken by the subject.

Those of skill in the art will understand that various embodiments may differ from the exemplary embodiments described above, without departing from the broader scope of this disclosure. Those of skill in the art will understand that the above-described exemplary embodiments may be implemented in any number of matters, including as a software module, as a combination of hardware and software, etc. For example, the exemplary method 200 may be embodied in a program stored in a non-transitory storage medium and containing lines of code that, when compiled, may be executed by a processor.

It will be apparent to those skilled in the art that various modifications may be made to the exemplary embodiments, without departing from the spirit or the scope of the invention. Thus, it is intended that the present invention cover modifications and variations of this invention provided they come within the scope of the appended claims and their equivalents.

What is claimed is:

1. A method of detecting and recognizing social interactions in a video, the method comprising:
    obtaining a video recording captured from a video recording device, the video comprising a plurality of frames, the video having been taken from a perspective of a person capturing the video within an environment, individual ones of the frames depicting a first-person perspective of the person within the environment;
    identifying patterns of attention depicted by living beings appearing in one or more of the plurality of frames;
    identifying one or more social interactions associated with the plurality of frames using the identified patterns of attention over one or more periods of time, such that a first social interaction is identified over a first period of time;
    associating individual ones of the plurality of frames and/or sets of one or more of the plurality of frames with one or more of the identified social interactions, a first set of frames being associated with the first social interaction; and
    using the identified social interactions and associated frames to affect one or more of a subsequent use, storage, presentation, or processing of one or more of the plurality of frames, such that the association of the first set of frames with the first social interaction affects one or more of the subsequent use, storage, presentation, or processing of one or more of the plurality of frames.

2. The method of claim 1, wherein the social interactions are identified based on temporal changes in the identified patterns of attention.

3. The method of claim 2, wherein individual ones of the plurality of frames are represented by a vector.

4. The method of claim 3, wherein individual ones of the vectors include one or more of a location of faces present within an image depicted in individual ones of the frames with respect to the first-person's perspective, an identification of roles present within the image, a representation of first-person head movement within the image, an identification of a speaker, a speech analysis, or an analysis of shifts in attention.

5. The method of claim 1, wherein the identifying patterns of attention comprises:
- identifying a plurality of faces within individual ones of the frames; and
- determining a location of individual ones of the identified faces with respect to the first-person perspective of the corresponding frame.

6. The method of claim 5, wherein determining a location comprises classifying individual ones of the plurality of faces based on a distance from the recording device and an angle from the recording device.

7. The method of claim 5, wherein identifying patterns of attention further comprises:
- determining an orientation of individual ones of the plurality of faces.

8. The method of claim 1, wherein identifying patterns of attention comprises one or more of:
- identifying a plurality of faces depicted in a given frame;
- determining a number of faces that are looking at a particular one of the other faces;
- determining whether the first person is attending to the particular one face;
- identifying whether the particular one face is attending to the first person; or
- determining a number of faces within the given frame that are looking at a same location as the first person.

9. The method of claim 8, wherein individual ones of the plurality of faces are classified into a role based on the identified patterns of attention.

10. The method of claim 1, wherein the identifying social interactions comprises:
- splitting frame vertically and horizontally into a plurality of sub-windows;
- splitting a flow vector field in individual ones of the sub-windows into vertical and horizontal components; and
- determining a vector that represents a mean value of motion for individual ones of the sub-windows.

11. The method of claim 1, further comprising:
- automatically editing the video recording based on the social interactions and associated frames, such that the automatically edited video includes the first set of frames associated with the first social interaction.

12. The method of claim 2, wherein the social interactions are further identified based on one or more of a Hidden Conditional Random Field ("HCRF") model, a Conditional Random Field ("CRF") model, a Hidden Markov Model ("HMM"), or a Granger causality model.

13. A video analysis system configured for detecting and recognizing social interactions in a video, the system comprising:
- a storage media storing a video recording captured from a video recording device, the video comprising a plurality of frames, the video having been taking from a perspective of a person capturing the video within an environment, individual ones of the frames depicting a first-person perspective of the person within the environment; and
- one or more physical processors configured by computer-readable instructions to:
  - identify patterns of attention depicted by living beings appearing in one or more of the plurality of frames;
  - identify one or more social interactions associated with the plurality of frames using the identified patterns of attention over one or more periods of time, such that a first social interaction is identified over a first period of time;
  - associating individual ones of the plurality of frames and/or sets of one or more of the plurality of frames with one or more of the identified social interactions, a first set of frames being associated with the first social interaction; and
  - using the identified social interactions and associated frames to affect one or more of a subsequent use, storage, presentation, or processing of the plurality of frames, such that the association of the first set of frames with the first social interaction affects one or more of the subsequent use, storage, presentation, or processing of one or more of the plurality of frames.

14. The system of claim 13, wherein the one or more physical processors are further configured by computer-readable instructions such that the social interactions are identified based on temporal changes in the patterns of attention.

15. The system of claim 14, wherein the one or more physical processors are further configured by computer-readable instructions such that the social interactions are further identified based on one or more of a Hidden Conditional Random Field ("HCRF") model, a Conditional Random Field ("CRF") model, a Hidden Markov Model ("HMM"), or a Granger causality model.

16. The system of claim 13, wherein the storage media is further configured such that individual one of the plurality of frames are represented by a vector.

17. The system of claim 16, wherein the storage media is further configured such that individual ones of the vectors include one or more of a location of faces present within an image depicted in individual ones of the frames with respect to the first-person's perspective, an identification of roles present within the image, a representation of first-person head movement within the image, an identification of a speaker, a speech analysis, or an analysis of shifts in attention.

18. The system of claim 13, wherein the one or more physical processors are further configured by computer-readable instructions such that identifying patterns of attention comprises:
- identifying a plurality of faces within individual ones of the frames; and
- determining a location of individual ones of the identified faces with respect to the first-person perspective of the corresponding frame.

19. The system of claim 18, wherein the one or more physical processors are further configured by computer-readable instructions such determining a location comprises classifying individual ones of the plurality of faces based on a distance from the recording device and an angle from the recording device.

20. The system of claim 18, wherein the one or more physical processors are further configured by computer-readable instructions such that identifying patterns of attention further comprises:
- determining an orientation of individual ones of the plurality of faces.

21. The system of claim 13, wherein the one or more physical processors are further configured by computer-readable instructions such that identifying patterns of attention comprises one or more of:
- identifying a plurality of faces depicted in the frame;
- determining a number of faces that are looking at a particular one of the other faces;
- determining whether the first person is attending to the particular one face;
- identifying whether particular one face attending to the first person; or determining a number of faces within the frame that are looking at a same location as the first person.

22. The system of claim 21, wherein the one or more physical processors are further configured by computer-readable instructions such that individual ones of the plurality of faces are classified into a role based on the patterns of attention.

23. The system of claim 13, wherein the one or more physical processors are further configured by computer-readable instructions such that identifying social interactions comprises:
   splitting frame vertically and horizontally into a plurality of sub-windows;
   splitting a flow vector field in individual ones of the sub-windows into vertical and horizontal components; and
   determining a vector that represents a mean value of motion for individual ones of the sub-windows.

24. The system of claim 13, wherein the one or more physical processors are further configured by computer-readable instructions to:
   automatically edit the video recording based on the social interactions and associated frames, such that the edited video includes the first set of frames associated with the first social interaction.

* * * * *